United States Patent [19]

Schornack

[11] 4,270,058
[45] May 26, 1981

[54] POWER SUPPLY AND CONTROL CIRCUIT FOR SERIES CONNECTED CONTROLLER

[76] Inventor: Louis W. Schornack, 7300 W. Keeney, Niles, Ill. 60648

[21] Appl. No.: 60,578

[22] Filed: Jul. 25, 1979

[51] Int. Cl.³ .......................................... H05B 37/02
[52] U.S. Cl. ................................. 307/140; 307/252 B; 307/252 N; 315/360
[58] Field of Search ............... 307/296 R, 252 B, 293, 307/246, 139, 140, 141, 143, 252 N, 252 W; 315/360; 328/258

[56] References Cited

U.S. PATENT DOCUMENTS

| | | | |
|---|---|---|---|
| 3,491,249 | 1/1970 | Rabinow | 307/141 |
| 3,940,660 | 2/1976 | Edwards | 315/360 |

*Primary Examiner*—Joseph W. Hartary
*Assistant Examiner*—James L. Dwyer

[57] ABSTRACT

A control circuit for a power threshold switch, like a power triac, to be connected in series with a load device, at a situs where only one AC power conductor and a conductor extending to the load device is available, is energized from a DC power supply energized from these conductors. The power supply includes a rectifier connected in series with an energy storage means, such as a capacitor, the terminals of which constitute the DC output terminal of the DC power supply, an impedance of much greater resistance than that of the load device and through which the capacitor is charged when the triac is in its non-conductive mode, and preferably a low power control triac shunting the high impedance and triggered momentarily into conduction each half cycle as the applied AC voltage goes through zero when the power triac is to be in its conductive mode, to effect charging of said energy storage means and subsequently the triggering of said power threshold switch into conduction.

23 Claims, 3 Drawing Figures

POWER SUPPLY AND CONTROL CIRCUIT FOR SERIES CONNECTED CONTROLLER

BACKGROUND OF INVENTION

It is often desirable that a controller and the power switching means it controls be combined in a two terminal device intended for connection in series with a source of electrical energy and the load being switched. A timer control for a lighting load, for example, so designed could be substituted for the ordinary wall switch which normally controls the light, even if both sides of the power line are not available in the switch box.

Such an arrangement, however, requires that the power supply for the controller receive its energy through the load during both states of the power switch; that is, when it is open or closed. An additional practical requirement of such a system is that the energy consumed by the controller be very small in comparison to the energy consumed by the load. This latter requirement is easily met by modern controllers, even for controlling loads as small as a few watts. Thus, the minute amount of power required by the controller can be supplied through the load when the power switch is open, the current then passing through the load being so small in comparison to the full load current that the load, for all practical purposes, is de-energized. When the power switch is closed, however, energy for the controller must be obtained in a different manner.

The prior published art teaches two methods for deriving a minute amount of power for the controller when such a power switch is closed, one method being shown in U.S. Pat. No. 3,491,249 to Rabinow, and the other by U.S. Pat. No. 3,940,660 to Edwards. In the method shown in U.S. Pat. No. 3,491,249 to Rabinow a constant low impedance is placed in series with the load, so that the voltage drop across this impedance is only a small fraction of the voltage of the power source. Rabinow's controller is an electric clock mechanism. He achieves the low impedance simply by switching the load from a high impedance low current clock coil to a low impedance high current winding on the clock coil for which the full-load current produces only a small voltage drop, but still supplies sufficient power at the relatively high load current to keep the clock running.

In U.S. Pat. No. 3,940,660 to Edwards (and also in later patents of others) there is disclosed a time division method of sharing power between the load and the controller when the power switch is closed. This method involves delivering energy to the controller power supply in the extremely short intervals during which a threshold type power switch like a triac is non-conductive at the beginning of each half cycle of the applied AC voltage.

If the method of Rabinow were to be applied to the power supply for an electronic controller rather than a clock mechanism controller, a transformer could be substituted for the clock motor coil. However, such a transformer would be bulky and costly in comparison to the method of this invention. Other series-connected low impedance devices could be used instead of a transformer however, but these also have their drawbacks. The series impedance could, for instance, be a small saturable core inductor but this would also be bulky and expensive in comparison to this invention. Back-to-back diodes could also be used. These would have the advantage of causing a relatively constant voltage drop. However, to obtain voltage high enough to power a typical electronic circuit might require stacking two or more pairs of back-to-back diodes or the use of back-to-back zener diodes. Such a system would be much less bulky than a transformer or saturable inductor. However, it has the serious drawback that the power consumed by the diodes is dependent upon the load current. If a wide range of loads is to be switched, such as lamp loads from 25 to 600 watts, the current range for a 120 VAC supply would be from about 0.2 to 5.0 amperes. If a 3.0 volt drop across the diodes were to be required for the electronic controller power supply, the power dissipation of the diodes would rise to 15 watts. This would preclude the design of a controller of small enough size to operate in a wall switch box because of excessive temperature rise. The situation would be even worse if the series impedance were purely resistance.

While the just described problems are avoided by the energy time sharing system described in the Edwards patent, this system has significant disadvantages. Thus, this time sharing system supplies the power to the controller power supply through a resistance (R1 in FIG. 2 of the Edwards patent) which is continuously connected to the AC power source through the load. When the load is switched "off", the power supply consisting of diodes (D1, D2, Z1, Z2) and capacitors (C1 and C2) and resistance R1 are in series with the AC power source and the load. Since the load is a low impedance compared to that of the resistance R1, resistance R1 must have a wattage rating nearly equivalent to the power it would dissipate if it were connected directly across the AC power source. Therefore, the value of resistance R1 should be made as high as possible when the load is switched "off", consistant with the small amount of power actually required by the controller circuitry. If the full AC power source voltage were always available, the resistance R1 could be made so high as to reduce its power dissipation to well under one watt. However, when the load is to be switched "on", the voltage for the control power supply is available only during those brief time-share instances when the load switch (in this case a triac) is non-conducting.

If the triac switch is to be non-conducting for a portion of each cycle or half cycle of the AC power source, then the triggering of the triac must be delayed from the moment of each zero crossing until the supply voltage has risen to a value sufficient to supply the required energy through resistance R1. However, it is very desirable that the voltage reached by the supply before the triac is switched on be as low as possible so as to deliver the maximum amount of power to the load, and even more important, to prevent the production of radio interference noise caused by the rapid switching characteristics of the triac. Studies have shown that switching incandescent lamps in a 120 volt AC circuit by means of a triac or the like requires the use of a filter network to suppress radio interference, unless the triac is switched very close to the "zero crossing" of the applied AC voltage, that is, prior to the voltage having increased (positively or negatively from zero) to more than about 5 volts. To maintain switching near zero crossing and still supply enough power through resistance R1 for the control power supply requires that resistance R1 should have as low a resistance as possible consistant with supplying the energy required by the control circuitry. Thus, there are contradictory requirements for the value of resistance R1 between times when the load is to be switched "off", where it is desirable to have resistance R1 a very high value, and when the load is to be switched "on", where it is desirable to have resistance R1 a very low or even zero value. The compromise required between these two desirable values of resistance R1 has been found to preclude the use of a low wattage resistor for resistance R1 and thus the time sharing system disclosed in the Edwards patent has the same excessive power dissipation problem of the series impedance method described previously. If a compromise with delivering full power to the load is made so that resistance R1 can have a substantially high value, then the supply voltage must rise to a value in excess of 50 volts and perhaps to as high as 100 volts, before the triac is triggered. In this case, however, a noise filter will be required to suppress radio interference and the cost and bulk will be considerably increased.

A second disadvantage of the time sharing system described is the manner in which both positive and negative gate current for triggering the triac is obtained. (It is most desirable to trigger a triac with a positive gate current for one half cycle and a negative gate current on the opposite half-cycle, since this requires the lowest value of gate current to assure triggering and the performance is thus most easily guaranteed by the manufacturer). In the system disclosed in the Edwards patent, to provide for dual polarity gate current, two control power supplies of opposite polarity must be supplied, thereby doubling the cost of the power supply. Also, since the gate current must be switched by logic circuits, discrete transistors or other control devices are required to switch the gate current, such as an NPN transistor (Q1) and PNP transistor (Q2). Since these transistors are reverse biased between emitter and base for one half cycle by the peak source voltage, they must be protected by the addition of diodes (D3 and D4). The need to use all these components considerably increases the cost and bulk of the controller as compared to a circuit like that of the present invention. However, the most serious disadvantage is that the value of resistance R1 required to prevent excessive power dissipation when the load is switched off requires delaying the triac trigger for the switched on state until the AC power source reaches a relatively high value, thus requiring the addition of a filter to eliminate radio interference noise.

There has recently been developed a power supply control circuit which overcomes the disadvantages of the prior published art just described and so makes possible the design of an extremely compact, low cost controller for a series connected load in which the total power dissipation is essentially that of the triac switch and which also provides near zero crossing switching in a manner that a radio interference filter is not needed. In this recently developed DC power supply and control circuit designed for controlling the flow of current through a threshold power switch, like a triac or SCR device, connected in series with the load there is connected in series between the AC input terminals of the circuit at least one rectifier, a parallel branch impedance circuit and an energy storage means, like a capacitor. The parallel branch impedance circuit has one high impedance branch which may comprise a resistor of such a high value that it absorbs a relatively small amount of power in comparison to the normal load power. For example, this resistor preferably absorbs only a small fraction of a watt of power when the threshold power switch is to be continuously non-conductive. The energy storage capacitor charges through this high impedance branch when the threshold power switch is continuously non-conductive.

The parallel branch impedance circuit has a low impedance branch in parallel with the high impedance branch, which low impedance branch is substantially non-conductive or has a very high impedance when the power switch is to be continuously non-conductive. It is rendered conductive to shunt the high impedance branch with a very small or almost zero resistance when the switch is to be operated in a conductive mode, so that the energy storage capacitor can be quickly charged from the applied AC voltage to a useful voltage for DC power supply purposes (such as voltage of preferably from about 4 to 5 volts) in a few degrees after the applied AC voltage passes through zero, when it has a similar very low amplitude, where little or no radio interference noise is generated when the power switch is operated to its conducting state. This normally non-conductive shunting impedance branch is most desirably the anode-cathode circuit of a triggerable control threshold device which was heretofore an SCR device. Such a device can be triggered into conduction by application of a relatively short, small, gate current, such conduction continuing for the balance of the half cycle involved, until the current flow through the anode and cathode (i.e. load) terminals thereof falls below a given low holding current level. The voltage across the capacitor is preferably fixed or limited to the desired voltage level by a zener diode connected across this capacitor, with its terminals oriented so as to be normally in a current blocking direction, except when the voltage across the capacitor exceeds the desired voltage level. When the threshold power switch is rendered conductive, it bypasses substantially all current from the DC power supply circuit just described, whereupon the resulting loss of holding current causes the shunting SCR device to be non-conductive. Thus, charging current can flow to the energy storage capacitor when the power switch is operating either in its conductive or non-conductive mode, in the latter case at any time through the relatively high impedance branch of the parallel branch impedance circuit, and in the former case during the short period following each passage of the applied AC voltage through zero and prior to the retriggering of the power switch into conduction.

In this recently developed DC power supply and control circuit the control terminal of the threshold power switch and one of the load terminals thereof are connected across a low trigger voltage developing resistance coupled between a full wave rectifier circuit and one of the AC input terminals, so that current flows in opposite directions through this impedance during successive half cycles of the applied AC voltage, to develop ideal voltages of alternating polarity for most efficient triggering of the triac or other AC threshold power switch. Only a very small voltage drop appears across this low resistance, which low voltage is incapable of triggering the power switch, when the shunting SCR device is non-conductive. When the SCR device is triggered into conduction each half cycle, when it is desired to operate the power switch in a conductive mode, a larger triggering voltage is developed across this low resistance by the much larger current flowing therethrough.

SUMMARY OF THE INVENTION

The present invention is an improvement over the just described DC power supply and control circuit in that it is a more simple and reliable control circuit. In accordance with one of the features of the invention, the aforementioned shunting SCR device is replaced by a low power control triac, which now is available for sale at a cost approximating the cost of a similarly rated SCR device. Such a control triac can be triggered into a conductive state during successive half cycles by a much simpler triggering circuit than that required to trigger a SCR device during successive half cycles of an applied AC voltage. The use of such a control triac is also advantageous from the standpoint that a full wave rectifier circuit is not needed to obtain triggering pulses of alternating polarity during successive half cycles, so that only a single rectifier is needed for this purpose. A further feature of the invention is the obtainment of successive power triac triggering pulses of alternating polarity without the need for a full wave rectifier circuit, preferably by the use of a zener diode connected in series with a low resistance to form a series circuit in parallel with the energy storage capacitor or other energy storing means connected in series with a rectifier. The terminal of the energy storage capacitor remote from the rectifier is connected to the terminal of the control triac remote from one of the AC input terminals, and the terminal of the rectifier remote from the energy storage capacitor is connected to the other AC input terminal. In such a circuit, voltage changes across the rectifier can be used as a control signal for initiating the generation of a control triac turn-on signal as the applied AC voltage passes through zero.

In the circuit described, during the half cycles when the energy storage capacitor is charging, the power triac is always triggered into conduction as the zener diode breaks down when the capacitor is charged to its maximum desired limit. The resulting current pulse generated in the low resistance in series with the zener diode triggers the power triac into conduction. During each half cycle following charging of the energy storage capacitor, current flows in the forward direction through the zener diode and through the control triac, where this current generates a reverse polarity triggering pulse in the low resistance in series with the zener diode, to effect triggering of the power triac.

While the most advantageous form of the invention is that just described where both the power threshold switch and shunting control threshold devices are triacs, it should be understood that some aspects of the invention have application to a DC power supply and control circuit where the lower cost consideration therefor may be outweighed by other considersations making the use of a SCR device instead of a triac preferable.

The previously described and other advantages and features of the invention will become apparent upon making reference to the specification to follow, the claims and the drawings.

DESCRIPTION OF EXEMPLARY EMBODIMENT OF THE INVENTION

Figure 1:
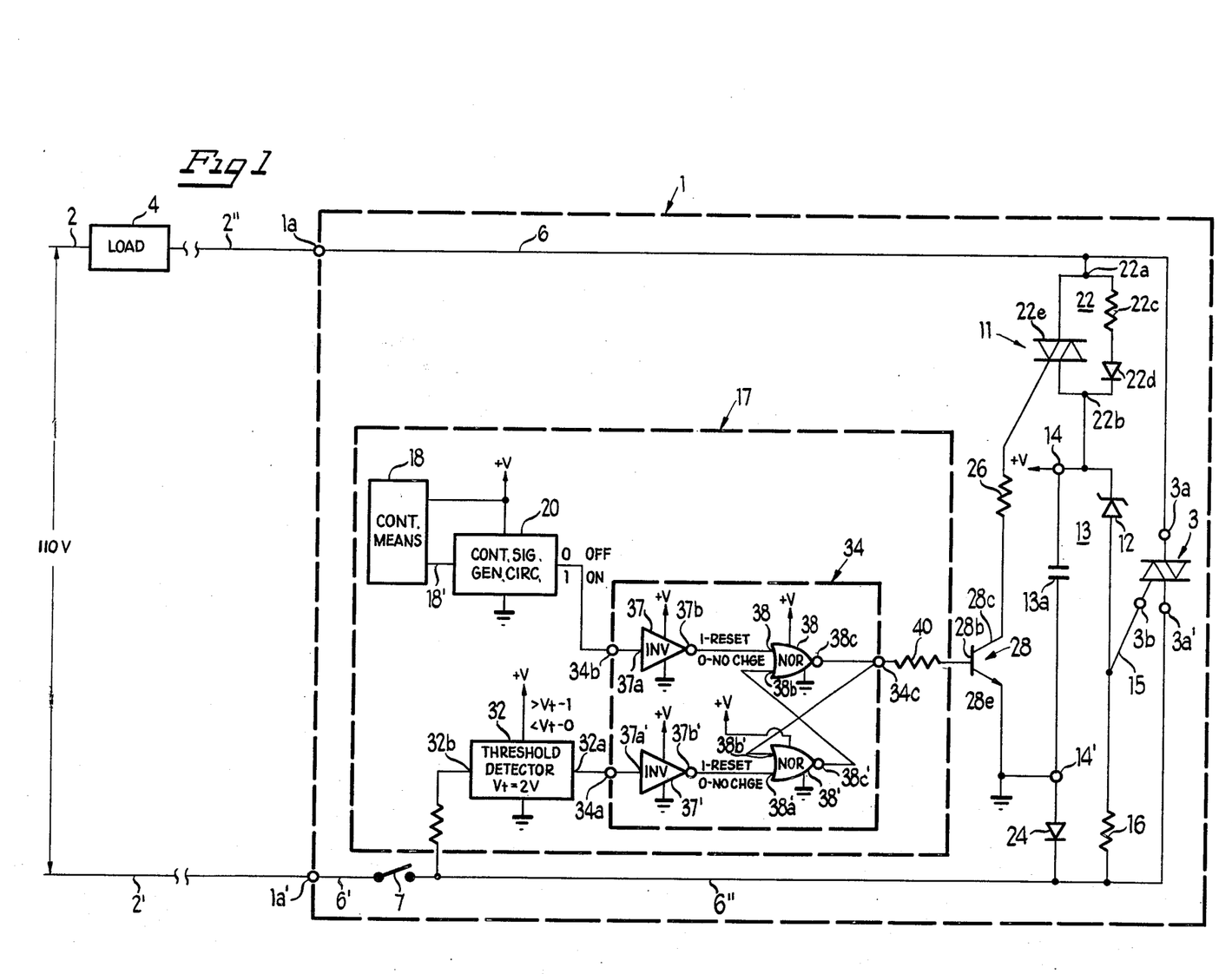
FIG. 1 shows a schematic diagram of the most preferred form of DC power supply and control circuit, wherein the power switch is a triac.

Refer now to FIG. 1 which illustrates the preferred power supply and control circuit of the invention generally indicated by reference numeral 1. This circuit may be incorporated in an enclosure assembly (not shown) mounted in an opening in a wall, which opening may be a conventional wall switch station opening in a residence, office building or the like, where the manually operable toggle arm operated switch unit normally mounted therein has been replaced by the enclosure assembly with the power supply and control circuit of the invention contained therein. As is conventional, such a wall switch station normally includes a pair of conductors 2'—2", conductor 2' being shown extending to one AC power line extending to one terminal of a load device or circuit 7, like one or more ceiling lights or wall outlet sockets, a heating unit, etc., whose opposite terminal extends to a conductor 2 connected to another AC power line. Applied across the power lines 2 and 2' may be 110 volt AC commercial power.

The conventional toggle arm operated switch normally interconnecting the conductors 2"—2' is replaced by a solid state power switch, preferably a threshold device like a power triac 3 as shown, through which AC can flow. The power supply and control circuit 1 has input terminals 1a—1a' respectively connected to the conductors 2"—2'. A conductor 6 extends between the terminal 1a and a load or main terminal 3a of the power triac 3. A conductor 6' extends between the AC input terminal 1a' and one terminal of an on-off switch 7 whose other terminal is connected by conductor 6" to the other load terminal 3a' of the power triac 3. When the triac is to be in a conducting mode, a triggering signal is fed to the control or gate terminal 3b of the triac each half cycle of the applied AC voltage, to initiate current conduction a few degrees after the applied AC voltage passes through zero and for the balance of the half cycle involved. In this short time interval between the instant the applied AC voltage passes through zero and the instant when the current actually flows between the triac load terminals 3a—3a', a power supply and triac triggering circuit generally indicated by reference numeral 11 connected in parallel with the triac load terminals 3a—3a' receives power from the AC input terminals 1a—1a' for both energizing a DC energy storage means 13 and operating a trigger signal generating circuit including circuit elements to be described.

The energy storage means 13 may comprise a chargeable battery or, as illustrated, a capacitor 13a to one terminal of which is connected a zener diode 12 which limits the DC voltage across the capacitor terminals 14—14' to a given desired value, for example, +4 volts. Terminal 14' will be considered to be at reference or chassis ground, and terminal 14 will be considered a positive "+V" terminal. The various circuits which are to effect control functions to be described are shown in block form with "+V" and ground terminal connections to terminals 14 and 14' for energizing these circuits.

The control terminal 3b of the triac 3 is connected by a conductor 15 to a trigger signal developing impedance shown in the form of a resistor 16, connected between conductor 6" leading through switch 7 to AC input terminal 1a', and the cathode of the zener diode 12. When the triac 3 is to be operated in a conducting mode, short voltage pulses of alternating polarity appear across the resistor 16 shortly after the beginning of successive half cycles of the applied AC voltage, which pulses initiate conduction of the triac 3 a few degrees after the applied AC voltage passes through zero. As indicated, once conduction is initiated each half cycle between the triac load terminals 3a—3a', conduction therebetween continues for the remainder of the half cycle involved until the current flow drops below a given holding current level. The triac 3 then becomes non-conductive until triggered into a conductive state by another trigger signal fed to control terminal 3b once again during the next half cycle involved.

The development or disappearance of triac triggering signals across resistor 16 is determined by a control circuit 17 which may include a control means 18, which could be a manual pushbutton, a thermostat control device (when load device 4 is a heating unit), a timer or other desired control device. In any event, the control means will produce signals on a control line 18' which may operate a suitable control signal generating circuit 20. Whenever the condition of the triac is to be modified, either from a conductive to a non-conductive state, or from a non-conductive to a conductive state, the control means 18 operates to cause the control signal generating circuit 20 (which could be a simple bistable circuit) to produce a "0" output representing a signal which operates the triac 3 in a non-conductive state, or a "1" output representing a signal which operates the triac 3 in a conductive state in a manner to be described.

Charging current to the capacitor 13a flows through a parallel branch impedance circuit 22 connected in series with the capacitor 13a. The terminal 22a of the parallel branch impedance circuit 31 remote from the energy storage capacitor 13a is connected to the AC input conductor 6. The opposite terminal 22b of the parallel branch impedance circuit 22 is connected to the positive terminal 14 of the energy storage capacitor 13a. A rectifier 24 is connected between the ground terminal 14' of capacitor 13a and the other AC input conductor 6" so that the capacitor 13a charges every other half cycle through the parallel branch impedance circuit 22. In a manner to be described, the voltage appearing across the rectifier 24 is used to initiate conduction of a preferably AC threshold device 22e forming one branch of the circuit 22 at or shortly after the applied AC voltage passes through zero when the triac is to be operated in its conductive mode.

The parallel branch impedance circuit 22 comprises a continuously high impedance branch including a resistor 22c having a resistance many orders greater than the resistance of the load device 4. For example, resistor 22c may have a value many thousands of times greater than that of the load device 4, so that the resistor 22c will absorb only a small fraction of the load rated power when power triac 3 is non-conductive. An energy-saving rectifier 22d is shown connected in series with the resistor 22a so that the resistor carries capacitor charging current only every other half cycle when the AC input conductor 6 is positive, to eliminate energy dissipation in the resistor 22c during the intervening half cycles.

Connected in parallel with resistor 22c and rectifier 22d is a low power control triac 22e (which costs only a fraction of the power triac 3). When the power triac is to be operated in the conductive mode, the control triac 22e is conductive every half cycle, so that current flows in alternating directions through trigger voltage developing resistor 16 during successive half cycles of the applied AC voltage. The gate or control terminal of the control triac 22e is preferably connected to ground through a resistor 26 and the collector-emitter terminals 28c-28e of a control transistor 28. When it is desired to operate the power triac 3 in a conductive mode, a positive voltage is fed to the base 28b of the transistor 28 beginning with the passage through zero of the applied AC voltage shown in FIG. 2A. This base applied positive voltage remains applied to the base 28b (until it is desired to operate the power triac 3 in a non-conductive mode in the particular circuit shown in FIG. 1) so as to render the control triac 22e continuously conductive. (However, the control triac 22e may also be triggered momentarily into conduction each half cycle, if desired, at or shortly after the applied AC voltage passes through zero, as in the form of the invention in FIG. 3 to be described.)

Figures 2A, 2B, 2C, 2D, 2E, 2F, 3:
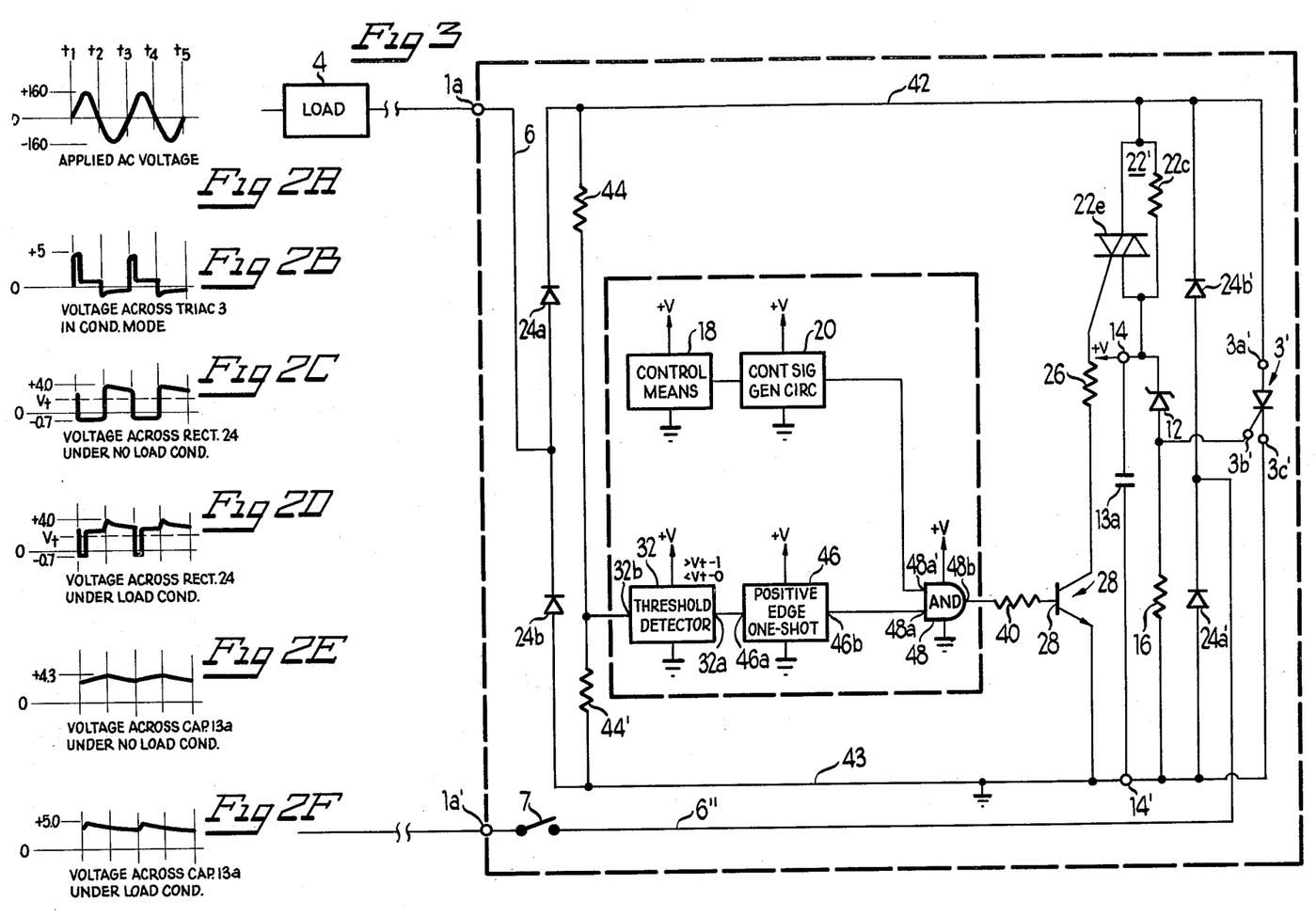
FIGS. 2A through 2F illustrate voltage waveforms in various parts of the circuit of FIG. 1.
FIG. 3 shows a DC power supply and control circuit where the power switch is a SCR device.

As shown in FIGS. 2E and 2F, at the beginning of each positive half cycle of the applied AC voltage the capacitor 13a is charged so that the voltage thereacross increases as it charges through the high impedance of resistor 22c under no load condition when power triac 3 is continuously non-conductive, or through control triac 22e when the power triac 3 is to be operated in its conductive mode. The capacitor 13a discharges during the intervening half cycles of the applied AC voltage.

When the control triac 22e is continuously non-conductive (i.e. when the power triac 3 is to be continuously non-conductive), the voltage on capacitor terminal 14 may never charge to a value which effects breakdown of the zener diode 12. (Even if the zener diode 12 should breakdown, the high resistance in the circuit limits the current flow through trigger voltage developing resistance 16 to a value where the power triac 3 is not triggered into conduction.) However, when the power triac is to be operated in a conductive mode and the AC input conductor 6 is positive with respect to the AC input conductor 6" and the gate of control triac 22e is grounded through the transistor 28, the resulting triggering of the control triac 22e causes the capacitor 13a to charge to a voltage which, because of the low resistance charge circuit involved, rapidly rises to a voltage (e.g. +5 volts with respect to ground) where the zener diode 12 breaks down. The sudden large pulse of current then flowing through the resistor 16 develops a voltage which triggers the power triac 3 into conduction, causing the voltage across the power triac terminals 3a—3a' suddenly then to decrease as shown in FIG. 2B to a very low value, where the storage capacitor 13a will then discharge, since the voltage applied to the capacitor 13a is now the very low voltage across the power triac 3. At the beginning of each intervening negative half cycle of the applied AC voltage when the capacitor 13a discharges because of rectifier 24, when the control triac 22e is conductive, a relatively large negative current flows through resistor 16 and the zener diode then conducting in a forward direction. This current produces a triggering voltage for the power triac 3 (which had become non-conductive when the current through the same dropped below its holding current level near the end of the previous half cycle).

In one satisfactory power supply and control circuit, some of the components shown in FIG. 1 were as follows:

resistor 22c—5.6K Ohms capacitor 13a—330 Microfarad
resistor 16—18 Ohms
triac 22e—0.8 amp pms rating
triac 3—0.8 amp pms rating
zener diode 12—4.3 volt break-down device A preferred exemplary control circuit for generating the control voltage fed to the base 28b of the transistor 28 will now be described. In this circuit, the voltage across the rectifier 24, when it drops below a threshold value like a Vt of +2 volts and the power triac 3 is to be operated in its conductive mode, is used to initiate conduction of the control triac 22e at the beginning of a half cycle of the applied AC voltage. To this end, a threshold detector 32 is provided, like a Schmidt trigger circuit or the like, which provides at its output terminal 32a a "1" signal when the voltage applied to its input terminal 32b is above the Vt level (with respect to ground) and provides at its output terminal a "0" signal when the voltage applied to its input terminal 32b drops below this control level. This output of the threshold detector 32 is fed to the input terminal 34a of a suitable bistable type circuit, which may be a cross coupled latching circuit 34 to be described.

The output of the control signal generating circuit 20 previously described is connected to the input terminal 34a of the latching circuit 34. The latching circuit 34 has an output terminal 34c at which a "1" transistor turn-on signal appears whenever this latching circuit is triggered into a set condition by the feeding of a "0" signal to the input terminal 34a thereof while the input terminal 34b receives a "1" enabling signal from the control signal generating circuit 20 (which occurs when the power triac 3 is to be operated in a conductive mode). Otherwise, the latching circuit output terminal 34c has a "0" transistor turnoff output. The latching circuit 34 includes an inverter 37' having an input terminal 37a' connected to the threshold detector output terminal 32a, and an output terminal 37b' connected to the input terminal 38a' of a NOR circuit 38'. The NOR circuit 38' has an output terminal 38c' connected to the input terminal 38b of a NOR circuit 38. The NOR circuit 38 has an output terminal 38c connected to the input terminal 38b' of the NOR circuit 38'. The NOR circuit 38 has an input terminal 38a connected to the output terminal 37b of an inverter 37 whose input terminal 37a is connected to the latching circuit input terminal 34b. The cross coupled NOR circuits 38—38' operate in such a manner that the application of a "0" signal to the NOR circuit input terminals 38a or 38a' from the associated inverters 37 or 37' will have no effect on the NOR circuit involved. However, when the output of inverter 37 feeds a "0" signal to NOR circuit input terminal 38a, the feeding of a "1" input signal to the input terminal 38a' of the NOR circuit 38' will operate the cross coupled NOR circuits so that a "1" output signal will appear on the output terminal 38c of the NOR circuit 38 (connected through resistor 40 to the circuit output terminal 34c) so that transistor 28 is continuously conductive. The "1" signal condition at the output of the NOR circuit 38 is reset to a "0" condition when the input terminal 38a of the circuit 38 receives a "1" signal from inverter 37 (which occurs when it is desired to operate the power triac 3 in a nonconductive mode).

As previously indicated, some aspects of the present invention are not limited to the circuit shown in FIG. 1. Thus, while some aspects of the invention deal with the use of a control triac or the like in a parallel impedance circuit like circuit 22, in conjunction with the control of power triac or the like, the broadest aspects of the invention are not so limited. As an example, FIG. 3 illustrates the application of the present invention to a DC power supply and control circuit 1' where the threshold power switch is a power SCR device 3'. In such case, instead of connecting the load terminals thereof across the AC input conductors 6—6", the anode and cathode terminals 3a' and 3c' of the power SCR device are shown connected between positive full wave rectifier bridge circuit output conductor 42 and a ground conductor 43. The voltage applied between the conductors 42 and 43 are a pulsating positive DC voltage in the particular circuit illustrated. The AC input conductors 6 and 6" respectively extend to full wave rectifier bridge circuit input points at the juncture of rectifier pairs 24a–24b and 24b'–24a' respectively connected in the same direction between the conductors 42 and 43. Accordingly, when conductor 6 is positive with respect to conductor 6", a current path through the power SCR device 3' can be traced from conductor 6 through the anode and cathode terminals of the rectifier 24a, conductor 42, the anode and cathode terminals of the power SCR device 3' and the anode to cathode terminals of the rectifier 24a', connected to the conductor 6". When the conductor 6 is negative with respect to the conductor 6", a current path through the power SCR device 3' can be traced from the conductor 6 and through the cathode to anode terminals of the rectifier 24b, ground conductor 43, the cathode and anode terminals of the power SCR device 3' and the cathode and anode terminals of the rectifier 24b' connected to the conductor 6".

The gate terminal 3b' of the power SCR device 3' is connected to the juncture of the zener diode 12 and resistor 16 connected directly in parallel with the capacitor storage 13a. The positive terminal 14 of the capacitor 13a is connected to a parallel branch impedance circuit 22' comprising the control triac 22e connected directly in parallel with the relatively large resistor 22c. The gate of the control triac 22e is coupled through a resistor 26 and the collector and emitter terminals of control transistor 28 which, when the SCR device 3' is operated in its conductive mode, receives positive pulses shortly after the instants the applied AC voltage passes through zero. Unlike the storage capacitor 13a of the circuit of FIG. 1 which is charged once every cycle, the capacitor 13a is charged each half cycle, since the control triac 22e conducts current in the same direction each half cycle as it is fired. Unlike the zener diode 12 in FIG. 1, the zener diode 12 in FIG. 3 never conducts current in its forward direction, so that each half cycle a positive pulse appears across the resistor 16 in series therewith, which effectively triggers the power SCR device 3' immediately after the capacitor 13a is charged to its maximum desired value. The voltage drop across the resistor 16 generates a voltage at the gate terminal 3b' of the SCR device 3' which is positive with respect to the cathode terminal 3c', effectively to trigger the device into conduction during each half cycle when the control transistor 28 is rendered conductive.

One exemplary circuit for controlling the conductive state of the control transistor 28 will now be described. It includes a pair of resistors 44 and 44' connected in series between the positive input conductor 42 and the ground conductor 43 where a pulsating positive DC voltage appears. The threshold detector 32, which may be the same Schmidt trigger circuit used in FIG. 1, has its input terminal 32b connected to the juncture between resistors 44 and 44'. Because of the full wave rectifier circuit described, at the beginning of each half cycle the voltage at the juncture between resistors 44 and 44' will increase from a voltage below threshold voltage Vt of the threshold detector to a voltage above the same. Assuming that the voltage Vt is +2 volts, the threshold detector will then produce a "1" output signal at the output terminal 32a thereof shortly after the beginning of each half cycle. When the applied voltage to the threshold detector is below Vt, the output terminal 32a of the threshold detector has a "0" output thereat. Accordingly, at the beginning of each half cycle the voltage on the threshold detector output terminal 32a will vary from a "0" to a "1" signal condition (representing a positive voltage), which signal is fed to the input 46a of a positive edge one-shot multivibrator 46 which is triggered into a condition producing a positive pulse P1 for a relatively short duration, like 500 microseconds. The output terminal 46b of the one-shot multivibrator circuit 46 is connected to the input terminal 48a of an AND gate 44 whose output terminal 48b is connected through a resistor 40 to the base of the control transistor 28. The AND gate circuit 48 has its other input terminal 44a' connected to the output of the control signal generating circuit 20 previously described in connection with FIG. 1, which circuit produces a "1" output signal when the power threshold device involved is to be operated in its conductive mode, and produces a "0" output signal when the power threshold device is to be operated in its non-conductive mode. Accordingly, it is apparent that when it is desired to operate the power SCR device 3' in a conductive mode, the simultaneous presence of a "1" signal at the two input terminals 48a and 48a' of AND gate 48 near the beginning of each half cycle will result in the rendering of the control transistor 28 conductive for about 500 microseconds, a sufficient time for the control triac 22e to be triggered into conduction causing the capacitor 13a to charge to its maximum value, to effect breakdown of the zener diode 12 to generate a triggering pulse across resistor 16 which renders the power SCR device 3' conductive.

The present invention has thus provided an exceedingly, simple and reliable DC power supply and control circuit for controlling the operation of a threshold power switch where access is had to only one main power conductor and a conductor extending to a load device or circuit controlled by the threshold power switch. It should be understood that numerous modifications may be made in the most preferred forms of the invention described without deviating from the broader aspects of the invention.

I claim:
1. In a DC power supply and control circuit including a pair of AC input terminals to be connected across and energized from one AC power line and one conductor extending to one terminal of a load device whose other terminal is to be connected across another AC power line, a triggerable threshold power switch having a pair of load terminals coupled to said AC input terminals and a control terminal for receiving a trigger signal which triggers said power switch into a conductive state which continues until current flow therethrough drops below a given holding current level during the half cycle of the applied AC voltage involved, control means for selectively providing or terminating a control signal which is to initiate a conductive mode of operation of said power threshold switch, and a DC power supply for said control means for energizing the same, said DC power supply including a chargeable energy storing means having output terminals at which appears the DC voltage to which the storing means charges, said output terminals being coupled to said control means to energize the same, and a circuit for feeding charging current to said energy storing means from said pair of AC input terminals, said circuit including rectifier means for converting AC to DC and a relatively large impedance means connected in series with said rectifier means and energy storing means, and shunting means for shunting said large impedance means with a low impedance during short intervals at the beginning of the half cycle conducting periods of the power switch when the switch is still non-conductive, the improvement wherein said shunting means is an AC threshold device having load terminals in parallel with said large impedance means and a control terminal, switching means selectively operable by said control signal to conductive or non-conductive states, the control terminal of said shunting AC threshold device being coupled only through said switching means between one of said AC input terminals and the terminal of said energy storage means remote from the other AC input terminal, and power switch triggering means following the conduction of said shunting AC threshold device each half cycle for generating a power switch triggering signal fed to the control terminal of said power threshold switch to trigger the same into conduction each half cycle shortly after said shunting threshold device becomes conducting, said energy storage means being charged by current flowing through the shunting threshold device at least every other half cycle prior to the initiation of conduction of said power threshold switch.

2. The DC power supply and control circuit of claim 1 wherein said power threshold switch is an AC threshold device, and said power switch triggering means includes a relatively low impedance in series with said AC shunting threshold device and through which a trigger voltage developing current flows in opposite directions during successive half cycles when said shunting AC threshold device becomes conductive, and means coupling the voltage drop across said low impedance means between said control terminal and one of the load terminals of said power threshold switch.

3. The DC power supply and control circuit of claim 1 wherein said threshold power switch is a DC threshold device, and said rectifier means is a full wave rectifier circuit connected between said AC input terminals and said DC threshold power switch, whereby full wave rectified AC renders said DC threshold power switch conductive each half cycle of the applied AC voltage when the power switch is operated in its conductive mode.

4. The DC power supply and control circuit of claim 1 wherein said power switch triggering means is responsive to the rise of the voltage across said energy storage means to a given predetermined value for immediately generating said power switch triggering control signal.

5. The DC power supply and control circuit of claim 4 wherein said power switch triggering means includes a voltage limiting threshold device connected in series with a low impedance through which a relatively large current flows which generates a triggering voltage for said power threshold switch when said shunting threshold device becomes conductive.

6. The DC power supply and control circuit of claim 5 wherein said voltage limiting threshold device is a zener diode.

7. The DC power supply and control circuit of claim 2 wherein said power switch triggering means includes a voltage limiting threshold device connected in series with said low impedance to form a current path in parallel with a series circuit comprising said energy storage means and a rectifier constituting said rectifier means, said voltage limiting threshold device being driven into a conductive state every other half cycle when said rectifier means is conductive and the energy storage means charges to a desired maximum value, so that the power threshold switch is rendered conductive after the energy storage means is fully charged, and as well during the intervening half cycles.

8. The DC power supply and control circuit of claim 1 wherein said power switch is a triac or the like and said rectifier means is a rectifier coupled between the terminal of said energy storage means remote from said one AC input terminal and said other AC input terminal, and said shunting threshold device is a triac or the like.

9. The DC power supply and control circuit of claim 1 or 8 wherein said control means includes a control for selectively generating a continuous enabling signal for effecting the operation of said power switch in a conductive mode, and logic circuit means responsive to a voltage charge across said rectifier means when said enabling signal is generated for generating a continuous triggering signal fed to said control terminal of the shunting threshold device initiated at or near the beginning of a half cycle of the applied AC voltage.

10. The DC power supply and control circuit of claim 2 wherein said power threshold switch is a DC threshold device, said rectifier means is a full wave rectifier bridge circuit comprising a first and second pair of rectifiers connected with the same orientation between a pair of bridge circuit output conductors, said AC input terminals being respectively connected to the juncture of said first and second pairs of rectifiers, said large impedance means and said shunting threshold device and said energy storage means shunted by said voltage limiting threshold device and low impedance means forming a circuit connected between said bridge circuit output conductors.

11. The DC power supply and control circuit of claim 10 wherein said trigger signal generating means includes threshold detector means having an input coupled between said bridge circuit output terminals, said threshold detector means producing a shunting threshold device triggering signal at the output thereof when the input voltage thereto rises above a given threshold level shortly after the applied AC voltage goes through zero and said control means provides said control signal indicating that said power threshold switch is to operate in a conductive mode.

12. The DC power supply and control circuit of claim 1 wherein said power threshold switch is an AC conducting device connected directly across said AC input terminals, said rectifier means comprises a rectifier coupled between said energy storage means and said other AC input terminal, and there is another rectifier in series with said relatively large impedance means between said energy storing means and the one AC input terminal.

13. A DC power supply and control circuit including a pair of AC input terminals to be connected across and energized from one AC power line and one conductor extending to one terminal of a load device whose other terminal is to be connected across another AC power line; a triggerable DC threshold power switch having a pair of load terminals to be energized from said AC input terminals and a control terminal for receiving a trigger signal which triggers said power switch into a conductive state which continues until current flow therethrough drops below a given holding current level during the half cycle of the applied AC voltage involved; control means for selectively providing or terminating a control signal which is to initiate a conductive mode of operation of said threshold power switch; a DC power supply for said control means for energizing the same, said DC power supply comprising a chargeable energy storing means having output terminals at which appears the DC voltage to which the storing means charges, said output terminals being coupled to said control means to energize the same, and a circuit for feeding charging current to said energy storing means from said pair of AC input terminals, said feeding circuit comprising a relatively large impedance, and a full wave rectifier bridge circuit connected between said AC input terminals and said DC threshold power switch, and energy storage means and large impedance, whereby full wave rectified AC can render said DC threshold power switch conductive and can charge said energy storage means each half cycle of the applied AC voltage, shunting means operable selectively from a high impedance condition to a low impedance condition where it shunts said large impedance means with a low impedance during at least the short non-conductive intervals at the beginning of each half cycle when the power switch is to be conductive, and switch means selectively operable by said control signal to a shunting means operating condition at least at or near the beginning of each half cycle of the applied AC voltage; and power switch triggering means which, following the operation of said shunting means to a low impedance condition, generates a power switch triggering signal fed to the control terminal of said threshold power switch to trigger the same into conduction each half cycle shortly after said shunting means is operated, said energy storage means being then charged by current flowing through said shunting means prior to initiation of conduction of said power switch.

14. The DC power supply and control circuit of claim 13 wherein said power threshold switch is an AC threshold device, and said power switch triggering means includes a relatively low impedance through which a trigger voltage developing current flows in opposite directions during successive half cycles when said shunting AC threshold device becomes conductive, and means coupling the voltage drop across said low impedance means between said control terminal and one of the load terminals of said threshold power switch.

15. The DC power supply and control circuit of claim 13 wherein said power switch triggering means is responsive to the rise of the voltage across said energy storage means to a given predetermined value for immediately generating said power switch triggering control signal.

16. The DC power supply and control circuit of claim 15 wherein said power switch triggering means includes a voltage limiting threshold device connected in series with a low impedance through which a relatively large current flows which generates a triggering voltage for said threshold power switch when said shunting means is operated to its low impedance condition.

17. The DC power supply and control circuit of claim 16 wherein said full wave rectifier bridge circuit comprises a first and second pair of rectifiers connected with the same orientation between a pair of bridge circuit output conductors, said AC input terminals being respectively connected to the juncture of said first and second pairs of rectifiers, the circuit of said large impedance means shunted by said shunting means and said energy storage means shunted by said voltage limiting threshold device and low impedance means forming a circuit connected between said bridge circuit output conductors.

18. The DC power supply and control circuit of claim 17 wherein said trigger signal generating means includes threshold detector means having an input coupled between said bridge circuit output conductors, said threshold detector means producing a shunting threshold device triggering signal at the output thereof when the input voltage thereto rises above a given threshold level shortly after the applied AC voltage goes through zero and said control means provides said control signal indicating that said power threshold switch is to operate in a conductive mode.

19. In a DC power supply and control circuit including a pair of AC input terminals to be connected across and energized from one AC power line and one conductor extending to one terminal of a load device whose other terminal is to be connected across another AC power line, a triggerable threshold power switch having a pair of load terminals coupled to said AC input terminals and a control terminal for receiving a trigger signal which triggers said power switch into a conductive state which continues until current flow therethrough drops below a given holding current level during the half cycle of the applied AC voltage involved, control means for selectively providing or terminating a control signal which is to initiate a conductive mode of operation of said threshold power switch, and a DC power supply for said control means for energizing the same, said DC power supply including a chargeable energy storing means having output terminals at which appears the DC voltage to which the storing means charges, said output terminals being coupled to said control means to energize the same, and a circuit for feeding charging current to said energy storing means from said pair of AC input terminals, said circuit including rectifier means for converting AC to DC and a relatively large impedance means connected in series with said rectifier means and energy storing means, and shunting means for shunting said large impedance means with a low impedance during short intervals at the beginning of the half cycle conducting periods of the power switch when the switch is still nonconductive, the improvement wherein said shunting means is a threshold device having load terminals in parallel with said large impedance means and a control terminal, switching means operable by said control signal to feed a triggering signal to the control terminal of said shunting threshold device at least at or near the beginning of each half cycle of the applied AC voltage when the power switch is to be operated in a conductive mode, and power switch triggering means for generating a power switch triggering signal fed to the control terminal of said power threshold switch to trigger the same into conduction every half cycle shortly after said shunting threshold device becomes conducting, and said power switch triggering means including a series circuit comprising voltage limiting threshold means and a low impedance which series circuit forms a current path in parallel with said energy storage means and through which path current flows during successive half cycles of the applied AC voltage, said voltage limiting threshold means being driven into a conductive state at least every half cycle when said energy storage means has charged to a desired maximum value, so that the power threshold switch is rendered conductive after the energy storage means is fully charged, and being conductive as well during any of the intervening half cycles should the energy storage means not be charging during a part of the same and means coupling the resulting voltage of alternating polarity across said low impedance means between said control terminal and one of the load terminals of said threshold AC power switch.

20. The DC power supply and control circuit of claim 19 wherein said threshold power switch and shunting threshold device are AC threshold devices and said rectifier means is a rectifier in series with said energy storage means in a path parallel with said series circuit, so that current flows in opposite directions through said series circuit during successive half cycles of the applied AC voltage.

21. The DC power supply and control circuit of claim 19 wherein said power switch is a triac or the like and said rectifier means is a rectifier coupled between the terminal of said energy storage means remote from said one AC input terminal and said other AC input terminal, and said shunting threshold device is a triac or the like.

22. The DC power supply and control circuit of claim 20 or 21 wherein said control means includes a control for selectively generating a continuous enabling signal for effecting the operation of said power switch in a conductive mode, and logic circuit means responsive to a voltage change across said rectifier means when said enabling signal is generated by generating a continuous triggering signal initiated at or near the beginning of a half cycle of the applied AC voltage and fed to said control terminal of the shunting threshold device.

23. The DC power supply and control circuit of claim 19, 20 or 21 wherein said voltage limiting threshold means includes a zener diode.

* * * * *